(12) United States Patent
Todd et al.

(10) Patent No.: US 12,106,185 B2
(45) Date of Patent: Oct. 1, 2024

(54) INCREASING DCF CONFIDENCE FOR ANALYTIC VALUE

(71) Applicant: EMC IP Holding Company LLC, Hopkinton, MA (US)

(72) Inventors: Stephen J. Todd, Center Conway, NH (US); Aurelian Dumitru, Round Rock, TX (US); Jason A. Shepherd, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 386 days.

(21) Appl. No.: 16/835,927

(22) Filed: Mar. 31, 2020

(65) Prior Publication Data

US 2021/0304065 A1  Sep. 30, 2021

(51) Int. Cl.
*G06N 20/00* (2019.01)
*G06F 16/27* (2019.01)
*G06N 5/02* (2023.01)

(52) U.S. Cl.
CPC ............ *G06N 20/00* (2019.01); *G06F 16/27* (2019.01); *G06N 5/02* (2013.01)

(58) Field of Classification Search
None
See application file for complete search history.

(56) References Cited

U.S. PATENT DOCUMENTS

| | | | |
|---|---|---|---|
| 2009/0196485 A1* | 8/2009 | Mueller | G06V 10/993 382/137 |
| 2009/0327200 A1* | 12/2009 | Smith | G06V 20/40 707/999.005 |
| 2011/0145178 A1* | 6/2011 | Schmidtler | G06N 20/00 706/20 |
| 2021/0124727 A1* | 4/2021 | Todd | G06F 16/2237 |
| 2022/0138325 A1* | 5/2022 | Todd | G06F 21/54 726/26 |

OTHER PUBLICATIONS

Jill Lovato, New Linux Foundation Effort to Focus on Data Confidence Fabrics to Scale Digital Transformation Initiatives, Oct. 28, 2019, TheLinuxFoundation (Year: 2019).*

* cited by examiner

*Primary Examiner* — Atta Khan
(74) *Attorney, Agent, or Firm* — Workman Nydegger

(57) ABSTRACT

Aspects of annotating data are disclosed. As data is ingested to a data confidence fabric, analytic values, which includes tags or annotations, are attached to or associated with the data by an analytic insertion mechanism. The analytic values allow the data to be used by applications including machine learning algorithms immediately. Feedback from the applications allow the analytic insertion mechanism to improve and generate more valuable analytic values and to generate higher confidence scores for the analytic values.

20 Claims, 9 Drawing Sheets

INCREASING DCF CONFIDENCE FOR ANALYTIC VALUE

FIELD OF THE INVENTION

Embodiments of the present invention generally relate to analytic values for data. More particularly, at least some embodiments of the invention relate to systems, hardware, software, computer-readable media, and methods for increasing an analytic value of data flowing through or ingested into computing systems including data confidence fabrics.

BACKGROUND

Generally stated, machine learning relates to artificial intelligence systems that have the ability to learn and improve over time. More specifically, machine learning allows an application to learn and improve based on data. In other words, machine learning algorithms use data to improve outcomes and outputs.

For machine learning algorithms to learn and improve, however, a substantial amount of data is required. However, access to a lot of data is often insufficient from the perspective of machine learning because the data is often unannotated. More specifically, even if repositories such as data lakes store a lot of data, there is a need to first annotate that data in order for the data to be useful for machine learning purposes.

For example, a weather application may have the ability to predict temperature based on past temperatures. Having access to raw temperature data, however, is insufficient. The data needs to be labeled or annotated in order for the application to recognize patterns and learn. Annotating temperature data with metadata such as time of year, location, geography, and the like improves the analytic value of the data. These annotations allow the application to learn and improve.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
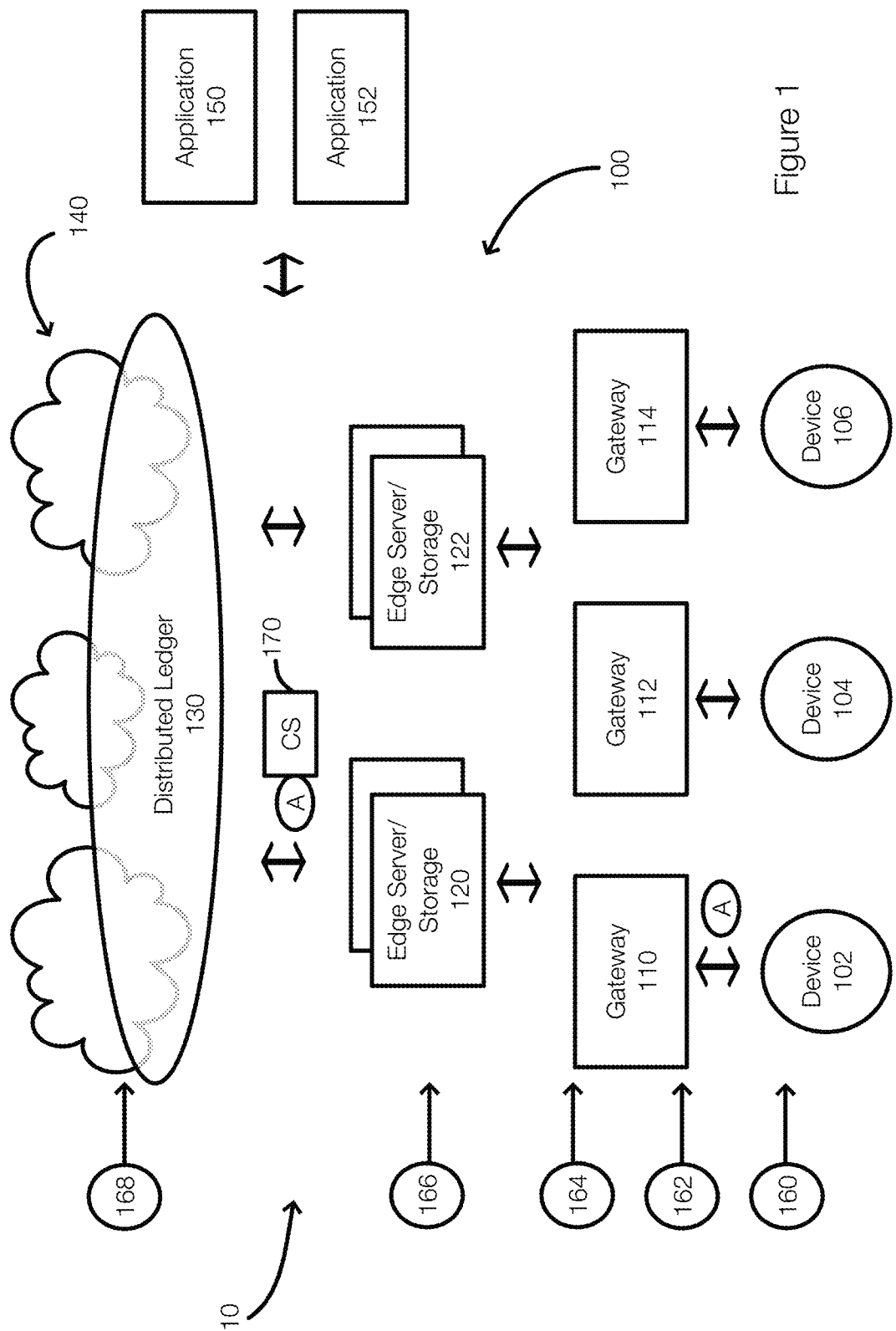
FIG. 1 illustrates an example of a data confidence fabric (DCF) implemented in a computing system.

Embodiments of the present invention generally relate to systems and methods for annotating data and increasing the analytic value of data. More particularly, at least some embodiments of the invention relate to systems, hardware, software, computer-readable media, and methods for annotating data including trusted data in computing systems including data confidence fabrics (DCFs).

Data is often ingested into computing systems in which DCFs are implemented. However, the ingested data may not be immediately available for analysis by an application such as a machine learning algorithm. More specifically, data is often ingested directly into an analytic environment such as a data lake or an analytic sandbox. Before the data can be used by a machine learning algorithm, the data needs to be annotated. Manual tagging the data (e.g., crowd-sourced tagging) is slow. Tagging the data using an automated analysis (e.g., scripts or annotation algorithms) often requires significant infrastructure (e.g., memory, compute, storage, network) and cost to complete the annotation in a timely manner.

Embodiments of the invention relate to tagging or annotating data while the data is generated and being ingested into the DCF. Embodiments provide an analytic insertion mechanism to attach tags (i.e., annotate the data) in an unsupervised fashion in one example and allow for annotations to improve over time. For example, the analytic insertion mechanism can operate in open and closed feedback manners. Machine learning algorithms can provide information, hints, or feedback that allow the annotation mechanism to add new tags, focus on specific tags, change analytic confidence scores and the like. The analytic insertion mechanism may also adapt to multiple machine learning algorithms, each of which may desire different tags or annotations.

Embodiments of the invention augment the ability of a computing system such as a DCF. Generally, a DCF is configured to generate confidence scores or determine the trustworthiness of ingested data. The DCF includes trust insertion technologies that are able to associate the ingested data with confidence scores. Applications that use the ingested data can thereby account for the trustworthiness of the data. For example, an application operating in a secure facility may need to use data that is very trustworthy (have a high confidence score) while data that is used by an application to control lights in a home may not need to be as trustworthy (a lower confidence score is acceptable). A DCF is able to give or associate data with scores from individual trust insertion technologies that can be combined in multiple ways to determine a final score or rank that relates to the trustworthiness of the data.

Embodiments of the invention further relate to inserting analytic values (e.g., annotations and other metadata) to data as the data is transmitted through a data confidence fabric.

As data flows through the DCF, the data is associated with confidence scores and analytic values. Before discussing the analytic insertion mechanism in a DCF, a description of a data confidence fabric and the insertion of confidence or trust scores is provided.

FIG. 1 illustrates an example of a computing network that includes or implements a DCF. FIG. 1 illustrates an example of a computing network 10 that includes a DCF 100 or in which the DCF 100 is implemented. The network 10 may include different network types including Internet capable networks, edge computing networks, cellular or telecommunications networks or the like or combination thereof.

FIG. 1 illustrates devices 102, 104 and 106. These devices 102, 104 and 106 may generate data that is ingested into the DCF 100. For example, the devices 102, 104 and 106 may be sensors, smartphones, edge devices, or other data sources. The data generated by the devices 102, 104 and 106 may depend on various factors and purposes. For example, the device 102 may be a smartphone device that is capable of generating a wide variety of data. In one example, location related data generated by the device 102 may be useful to the application 150 if the application 150 is a map generating application. If the device 104 is a weather sensing device, the data produced by the device 104 may be useful to a weather-related application such as the application 152. Embodiments of the invention relate to a wide variety of devices, applications, and networks.

The data generated at the devices 102, 104 and 106 may be ingested through a gateway, such as the gateways (GWs) 110, 112 and 114. A gateway, by way of example only, may be configured to receive data from devices such as edge devices 102, 104, and 106 and perform processing on the data. The gateways 110, 112, and 114 may deliver the data to servers/storage 120 and 122. The servers 120 and 122 can store the data, perform processing, or the like. The DCF 100 may be associated with a distribute ledger 130 (e.g., a multi-cloud distributed ledger) that allows data to be recorded more securely. The cloud 140, which may include multiple clouds from different providers, may also provide other processing, storage, and computing resources. The applications 150 and 152 can be distributed in the network 10 and be part of the DCF 100 and may operate at different levels and/or locations.

In this example, the applications 150 and 152 may interact with edge data from the devices 102, 104 and 106 with knowledge of the trustworthiness (e.g., a confidence score) of the data being ingested into the DCF 100. In each layer of the DCF 100, data and applications are being brought together with known confidence scores in this example.

When implementing the DCF 100, trust insertion technologies are examples of tools that can be used to increase the confidence in edge data. Examples of trust insertion technologies include, but are not limited to, hardware root of trust capabilities, co-processors and accelerators, digital signatures, identity management, secure ingest software, encryption, immutable storage, data protection policies, distributed ledgers, or the like or combination thereof.

The number and type of trust insertion technologies is large, and each may be associated with a different trust increase. Differences or disparities in the trustworthiness of these technologies can impact the overall trustworthiness of the DCF. Some components or technologies are better able to insert or add trust to data flowing in the network.

When a DCF is implemented, the trustworthiness of the data is improved. Because the DCF 100 may include multiple trust insertion technologies, confidence scores can be changed at multiple locations as the data is ingested into the DCF 100.

In FIG. 1, data A is generated by the device 102. IoT (Internet of Things) capable devices, sensors, smartphones, computers, tablets, and other data generating device and the like are examples of the device 102. The data A is ingested into the DCF 100 and flows through the DCF 100. After flowing through the DCF, the data A may be stored in a repository that can be accessed by the application 150 (or another application). The data A may also be stored at various locations while flowing through the DCF 100. The data A is also associated with a confidence score (CS) 170 or with multiple confidence scores that may be stored in the distributed ledger 130. For example, the score of each trust insertion technology may be retained.

The DCF 100 may be implemented on a wide variety of devices and networks. When data is collected on an edge of a network, the data may flow through various levels of hardware environments that have various levels of processing, memory, and storage capabilities. From a hardware perspective, the data may flow from the data-generating device 102 to a server computer or to a gateway device 110. The server computer or gateway 110 may send the data to another server that is configured to aggregate data from multiple gateways. That server may send the data to a storage environment where the data can be accessed and used by applications.

In this path, different devices, services, or applications may handle or process the data. Typically, each interaction with the data may be associated with a trust insertion, where trust metadata is inserted with or associated with the ingested data. When the data reaches the application or is stored, the data is thus stored or associated with a trust or confidence score and/or metadata used to determine or calculate the trust or confidence score. The data and/or the associated score may be scored immutably.

In this example of FIG. 1, each of the devices and/or services and/or applications that handle the data may adjust or change the trustworthiness of the data. This is often achieved by contributing to the confidence score of the data. More specifically, in one example, this is achieved by providing a score that impacts the confidence score or rank of the data. Typically, the scores are cumulative: each trust insertion technology contributes to the overall confidence score. Embodiments of the invention allow the score or rank to be computed using more than simple addition. Other formulations may also be implemented, such as multiplication, addition, weighting, and/or combination thereof or the like. More specifically, the overall confidence score can be determined from the individual scores using addition, multiplication, weighting, other scoring algorithms, or the like or combination thereof.

FIG. 1 illustrates examples of trust insertion technologies 160, 162, 164, 166 and 168. The trust insertion technologies include, by way of example and not limitation: trust technology 160 where the devices are signing their data (hardware root of trust signatures on device data); trust technology 162 where the ingest software rejects non-authorized/non-authenticated application access to the data (strong N-S-E-W authentication/authorization); trust insertion technology 164, where provenance metadata is appended to the data from the devices (provenance metadata attachment such as information about a data capture environment); trust insertion technology 168, where data is stored onto a cryptographically-protected object store (secure immutable scale-out edge persistence); and trust technology 168, where a record of the data/metadata is registered in a distributed ledger (e.g., registration of trusted assets in a multi-cloud distributed ledger).

The confidence added by these trust insertion technologies can be stored with the data or in another location such as the distributed ledger 130. As the data A traverses the DCF 100, scores are added to the data and results in a confidence score that can be used by an application. For example, an application may only use data that has a threshold confidence score. The applications can account for the confidence scores as they execute.

Figure 2:
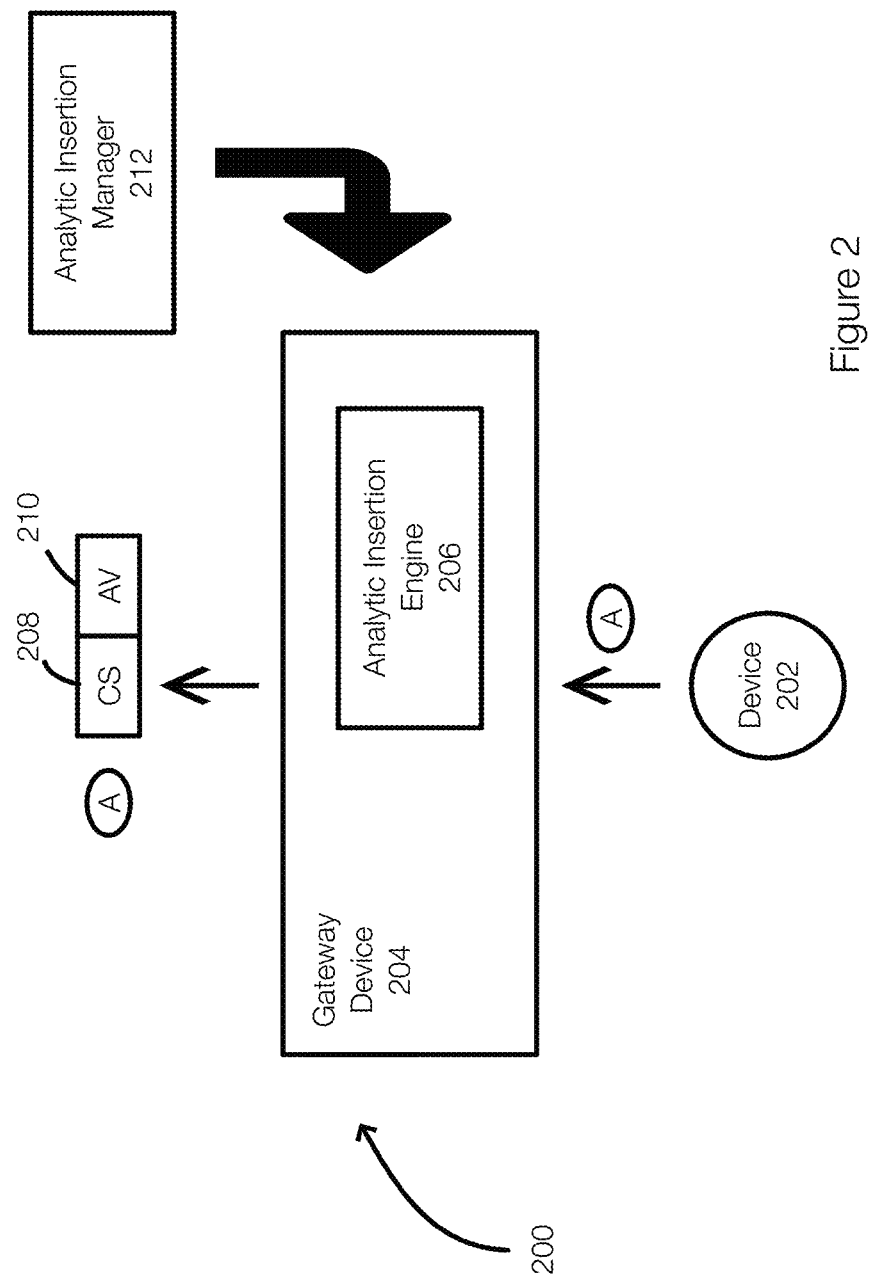
FIG. 2 illustrates an example of an analytic insertion mechanism configured to insert or add analytic value to data ingested into a DCF.

FIG. 2 illustrates a portion of a DCF that includes an analytic insertion mechanism that may include an analytic insertion manager and an analytic insertion engine. FIG. 2 illustrates a portion of a DCF 200. In FIG. 2, a device 202 generates data A that is ingested into the DCF 200 by or through a gateway device 204. The gateway device 204 includes or is associated with an analytic insertion engine 206 that adds analytic value to the data A. When the data leaves the gateway device 204, the data A is associated with a confidence score (CS) 208 and an analytic value (AV) 210.

The analytic insertion engine 206 provides the DCF 200 with the ability to insert analytic value (e.g., annotations, tags, and/or other metadata). In other words, the raw data generated by the device 202 can be annotated such that the data A is immediately available for use by applications including machine learning applications.

The analytic insertion engine 206 may be associated with an analytic insertion manager 212 operating in or with the DCF 200. The analytic insertion manager 212 may be configured to update the analytic insertion engine 206 or add new components to the analytic insertion engine 206. This may be done based on feedback from the applications using the data and corresponding analytic value 210. For example, the analytic insertion engine 206 may be unsupervised. Initially, there may be low confidence in the analytic values generated and associated with the ingested data. However, feedback can be used to train and improve the operation of the analytic insertion engine 206. Over time, the analytic insertion engine 206 improves and the confidence in the analytic values attached or inserted increases.

In FIG. 2, the analytic insertion engine 206 operates at the gateway level of the DCF 200. As the data A is ingested from the device 202, the analytic insertion engine 206 inspects the data A and attaches an analytic value 210 (or analytic metadata) to the data A. This analytic value 210 accompanies the trust metadata or CS 208 that may be added to the data A.

Figure 3:
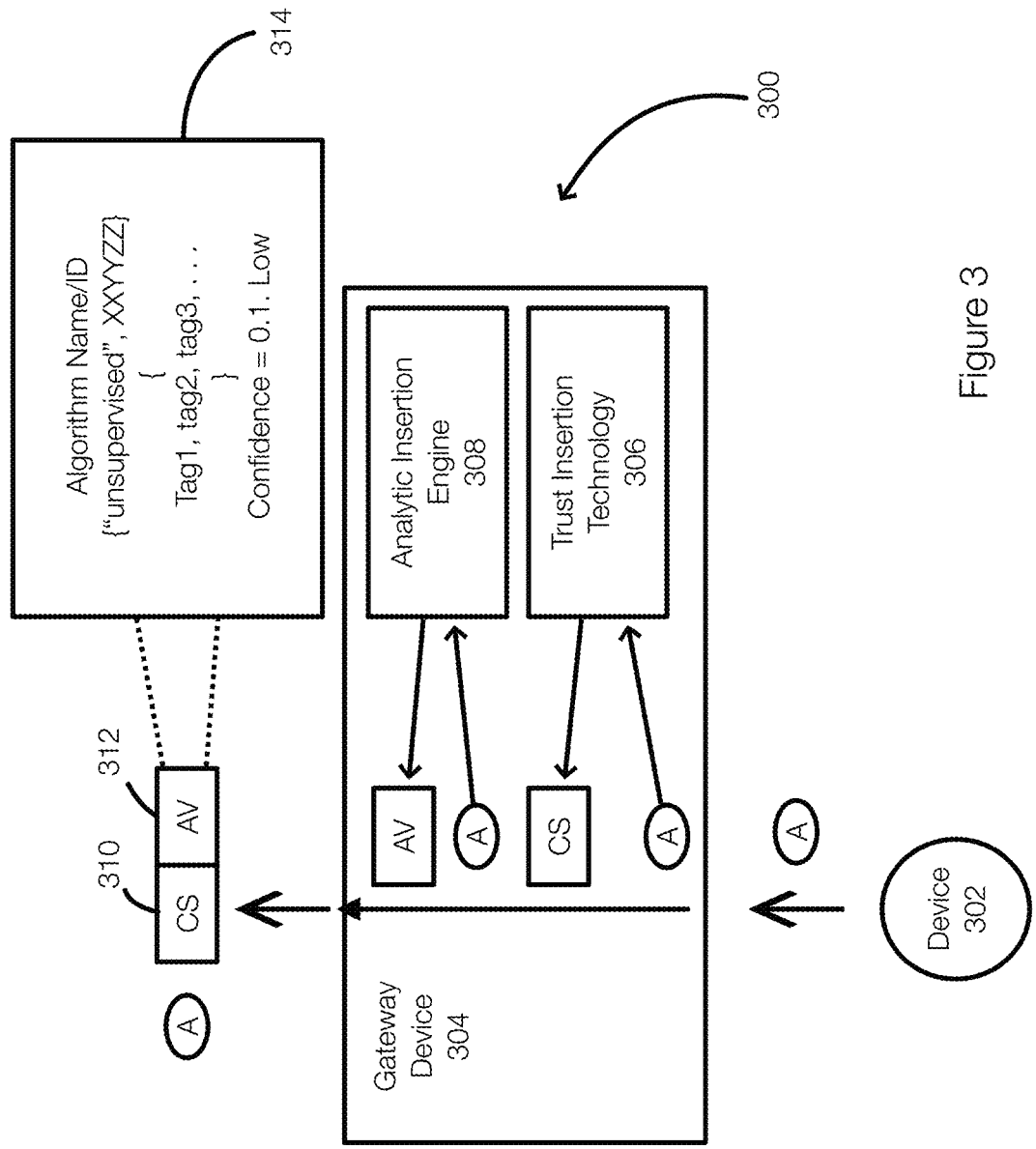
FIG. 3 further illustrates an example of inserting or adding both confidence scores and analytic values to data ingested into a DCF.

FIG. 3 illustrates an example of a DCF that includes an analytic insertion mechanism. FIG. 3 illustrates a DCF 300 (or a portion thereof) that ingests data A from a device 302. The data A is received by a gateway device 304 that is associated with an analytic insertion engine 308 and a trust insertion technology 306. As illustrated in FIG. 3, the trust insertion technology 306 receives or analyzes the data A and generates a confidence score CS 310 (and/or other trust metadata) that is associated with the data A. Other trust insertion technologies may insert trust at other locations of the DCF 300.

In this example, the analytic insertion engine 308 inspects or analyzes the incoming data A and generates an analytic value (AV) 312 that is also associated with the data A. The AV 312 and the CS 310 may accompany the data A or are associated with the data A as the data A passes through the DCF 300. In another example, the AV 312 and the CD 310 may be stored in the DCF 300 (e.g., in a distributed ledger) and updated by the various components during ingestion.

FIG. 3 also illustrates an analytic value 314, which is an example of the AV 312. By way of example only and not limitation, the AV 314 may include various fields. The AV 314 may include the name of an algorithm included in the analytic insertion engine 308 that analyzed the data A. This may be a descriptive name of the type of algorithm. Algorithm class and type are also high value descriptors. The algorithm class, by way of example, may be regression and the type may be linear regression or logistic regression. Another class may be tree-based algorithms and types may include decision trees or random forest. By including the class and/or type in the AV 314, a process may be able to identify the classes/types generate the most or best insights, tags, and the like. This may be included in feedback provided to the analytic insertion mechanism. The AV may also include an ID (e.g., XXYYZZ). The unique ID may be a URL or a content addressable hash of the algorithms, or an index into a table of algorithms. This allows algorithms to be selected and added, removed, and/or updated as desired.

The AV 314 may also include a set of metadata tags that the analytic insertion engine 308 generates for the benefit of applications including machine learning applications. The AV 314 may also include an analytic confidence score (e.g., on a scale of 0-1.0 in one example). Initially, the analytic confidence score is low at least because the analytic insertion engine 308 (or its analytic algorithms) may have no understanding regarding the value of the tags to a machine learning algorithm or any other application. In other words, the AV 314 reflects that the analytic insertion engine 308 is not sure whether the tags are useful at this stage. Over time, the analytic confidence can change. The tags generated by the analytic insertion engine 308 can be generic in nature or developed specifically for device types or classes of devices or can be generated for specific applications.

Figure 4:
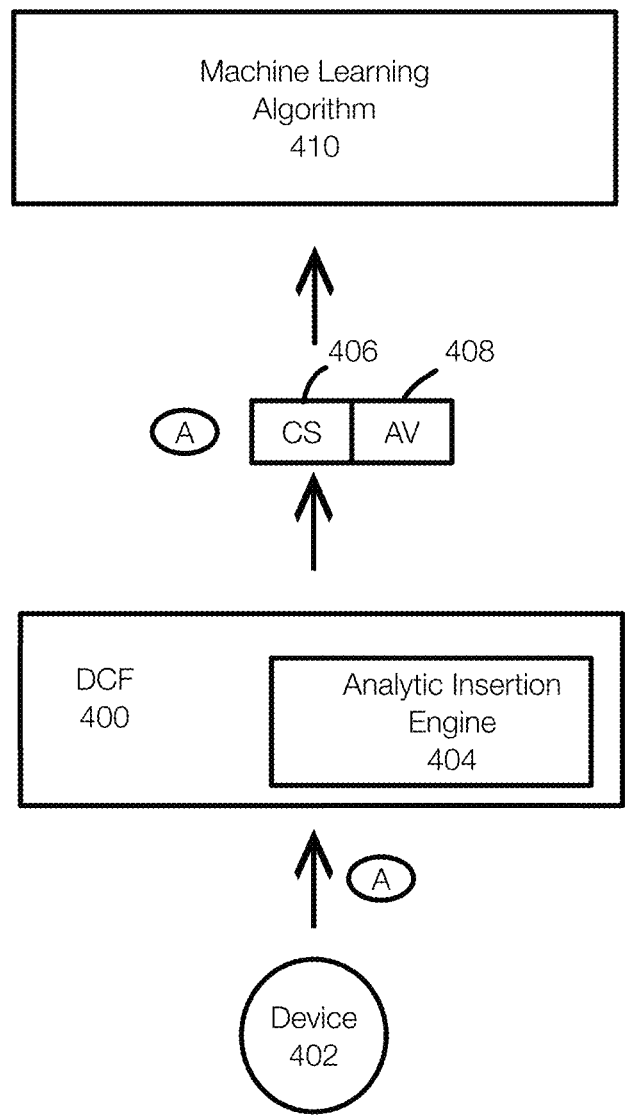
FIG. 4 illustrates an example of data that is associated with an analytic value and that can be used by an application such as a machine learning algorithm.

FIG. 4 illustrates an example of a DCF that generates annotated data. FIG. 4 illustrates a DCF 400 that includes an analytic insertion engine 404. The analytic insertion engine 404 inserts or associates analytic value 408 with data A as the data A is ingested into the DCF 400. As previously stated, a CS 406 is also added or attached to the data A.

Because the data A is associated with an analytic value 408, which may include metadata such as tags, a machine learning algorithm 410 can immediately use the annotated data A. Based on the tags or other metadata in the analytic value 408, the machine learning algorithm 410 can recognize behavior or attributes, generate insights, make predictions, or the like. Further, the machine learning algorithm 410 does not have to wait for the data A to be annotated. Rather, the machine learning algorithm 410 can explore the analytic value 408 and the potential applicability to various applications including, for example, business insights.

Figure 5:
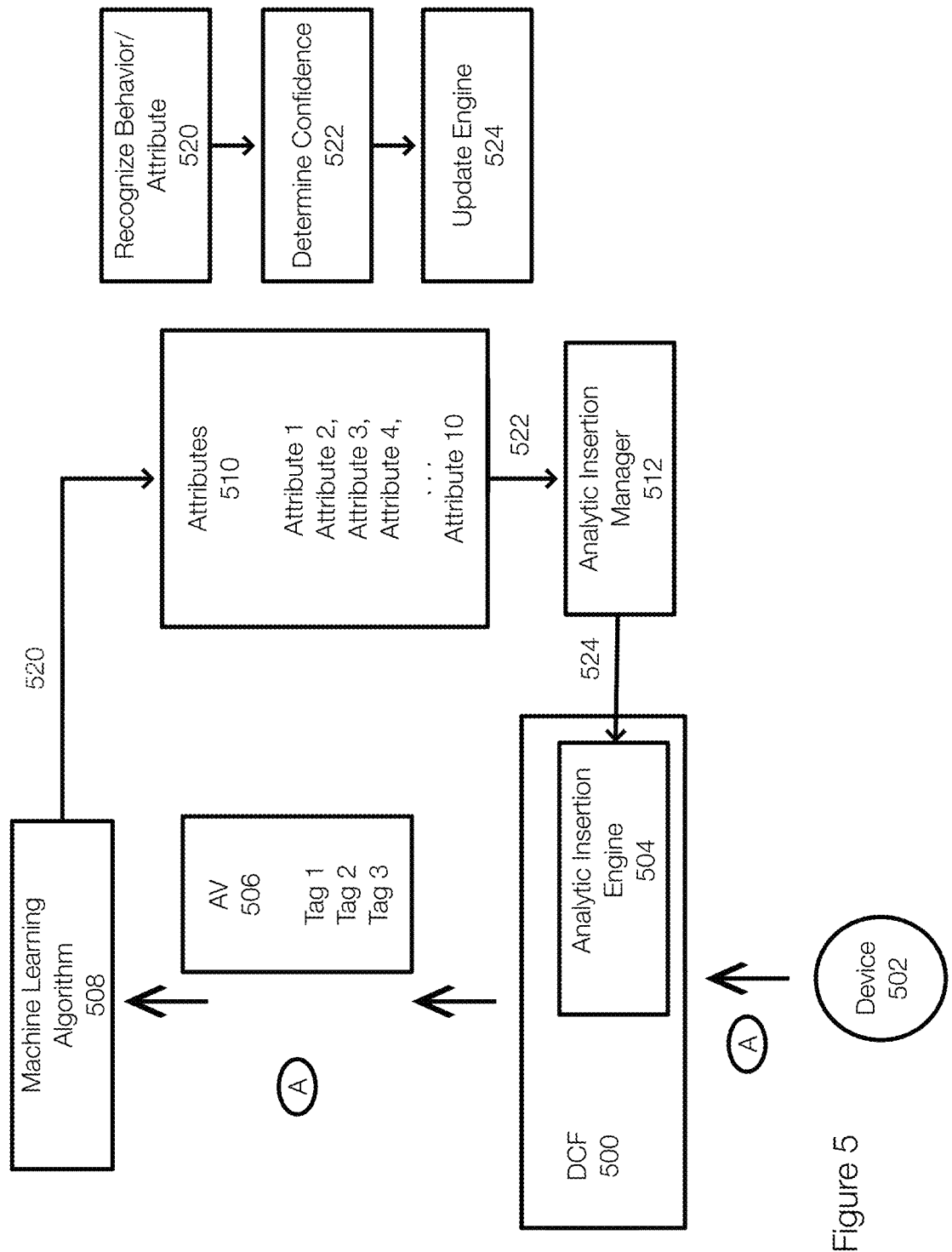
FIG. 5 Illustrates an example of feedback that improves the confidence of analytic values added to data by an analytic insertion mechanism.

FIG. 5 illustrates an example of improving analytic insertion mechanisms using feedback. In FIG. 5, the data A generated by the device 502 receives (in addition to a confidence score) an analytic value from the analytic insertion engine 504. The analytic value (AV) 506 may include annotations, features, or tags (e.g., tag 1, tag 2, and tag 3).

Because the data A has been annotated, the data A can be consumed by an application such as the machine learning algorithm 508. In this example, the machine learning algorithm 508 may recognize two of the tags. More specifically, the machine learning algorithm 508 may desire or need or is looking for data with certain attributes 510 (e.g., attributes 1-10). Upon analyzing the AV 506, the machine learning algorithm 508 may recognize 520 behavior or attributes with which the data A has been annotated. For example, the tag 1 may correspond to attribute 2 and the tag 3 may correspond to the attribute 4. This represents 20 percent (2 out of 10 attributes) of what the machine learning algorithm 508 would like to receive. This feedback (e.g., tags that match attributes) is provided to the analytic insertion manager 512. This feedback allows the analytic value or confidence to be determined 522. In one example, the analytic confidence scores of specific tags can be increased, at least with respect to a specific application.

The analytic insertion manager 512 may then update 524 the analytic insertion engine 504 based on the feedback and the analytic insertion engine 504 may insert an increased confidence score into the AV 506 (e.g., raise to 0.2 from 0.1). The analytic insertion engine 504 is now smarter and able to perform inline tagging with increasingly valuable tags.

Figure 6:
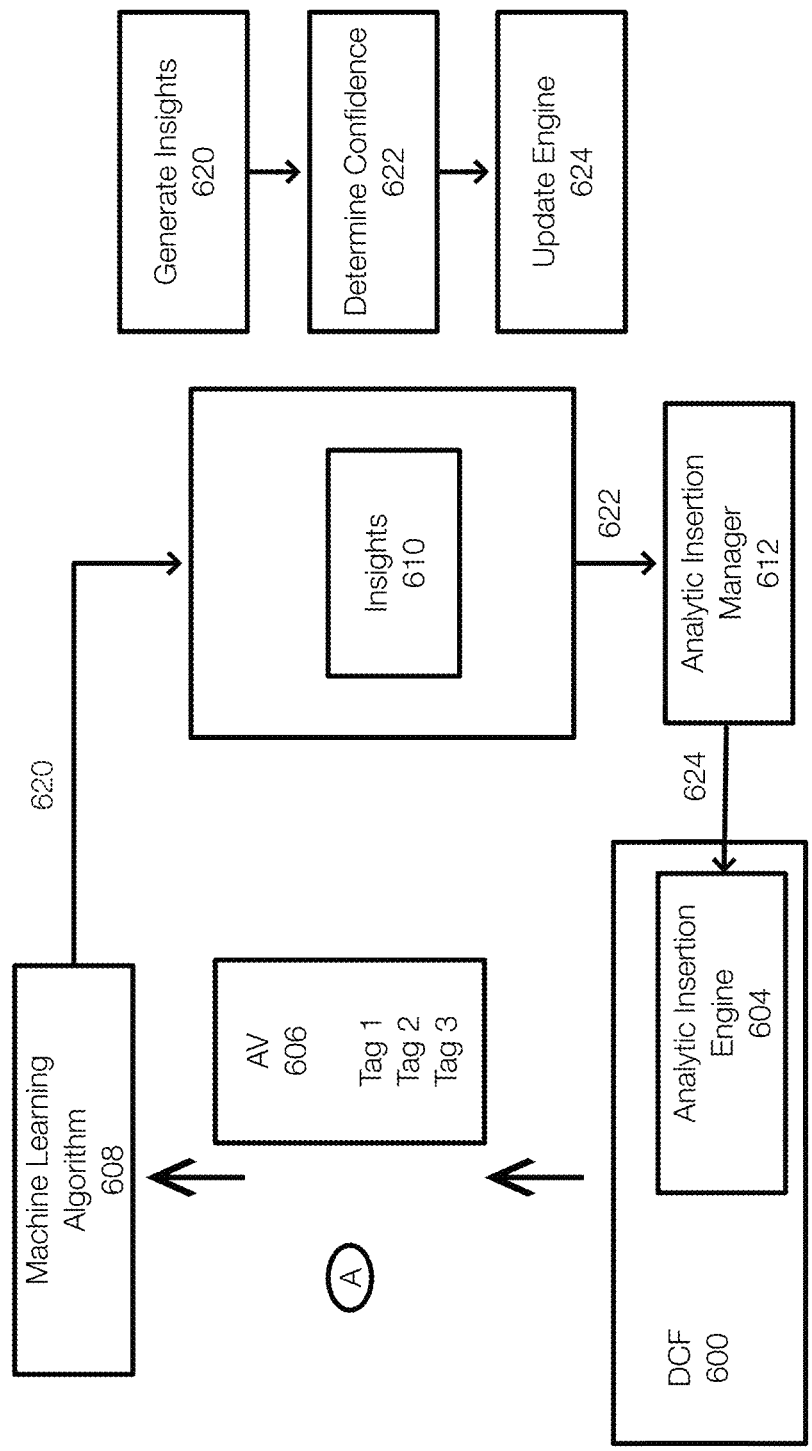
FIG. 6 Illustrates another example of feedback that improves the confidence of analytic values added to data by an analytic insertion mechanism.

FIG. 6 illustrates another example of feedback to an analytic insertion mechanism. In FIG. 6, the machine learning algorithm 608 may generate 620 insights 610. More specifically, generating insights is distinct from matching tags. Generating insights represents the ability of an application to identify relationships in the data being analyzed.

Consider an example where a business experiences customer churn. The data from devices such as cell phones may be annotated with a tag A indicating that application A has failed and a tag B indicating that application B has failed. The machine learning algorithm may be able to identify a relationship between customer churn and the failure of both application A and application B. In other words, a customer may churn when both applications fail but not when only one of the applications fail.

In this example, the tags may match attributes that are useful to an entity (as discussed in FIG. 5). However, the insight generated from these tags may be more valuable to the entity. As a result, the determining 622 the confidence can be impacted by the tags in the AV 606 and the insights 610 generated therefrom.

More specifically, the matching tags may result in insights 610 that represent a 50% improvement. In other words, a 20% match may lead to a 50% insight generation 620 improvement. The analytic insertion manager 612 can determine 622 a confidence for this result and generate another version of or update 624 the analytic insertion engine 604 for the DCF 600.

The improved analytic insertion engine 604 may emphasize the collection of the specific tags that lead to improvements in insight and may generate a higher confidence score for those tags. Insights can help understand phenomenon, lead to new opportunities, or the like.

Figure 7:
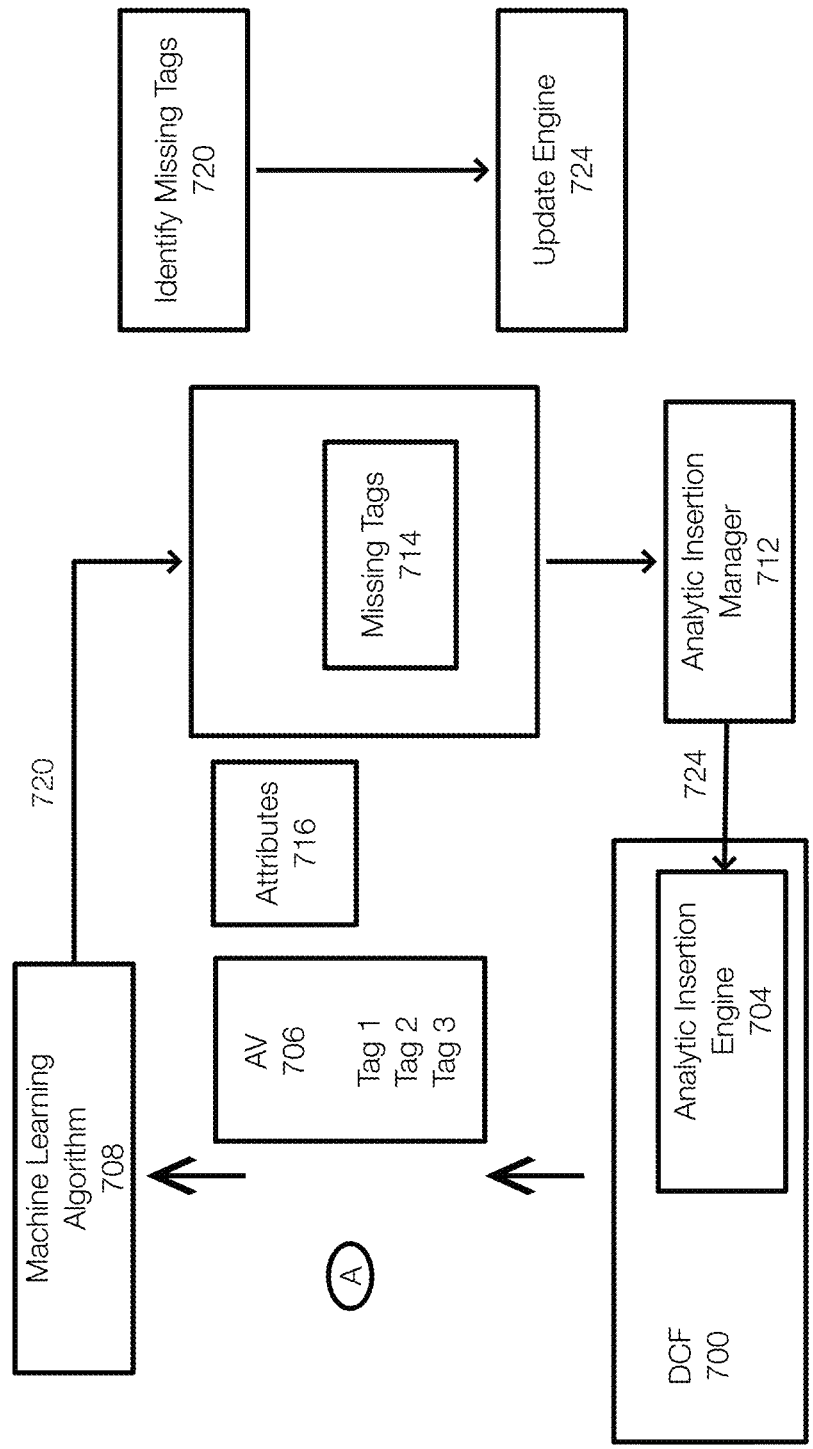
FIG. 7 Illustrates another example of feedback that improves the confidence of analytic values added to data by an analytic insertion mechanism.

FIG. 7 illustrates another example of feedback to an analytic insertion manager. In this example, the machine learning algorithm 708 may compare tags in the AV 706 with attributes 716 as previously discussed. In this example, missing tags 714 (or tags not included in the AV 706) may be identified 720. The analytic insertion manager 712 can then generate a new version of the analytic insertion engine 704 or update the analytic insertion engine 704 to look for the missing tags in data ingested into the DCF 700.

Thus, as new algorithms are deployed to the analytic insertion engine 704, these algorithms effectively give the analytic insertion engine 704 knowledge about tags that could be included in the AV 706. The updated analytic insertion engine 704 may also have the capability of identifying the missing tags. In other words, the analytic insertion engine 704 gains an understanding of the missing tags (or improves its ability to annotate data) and annotates data when those data types are found or ingested. As a result, the number of tags included in the AV 706 may increase over time.

Figure 8:
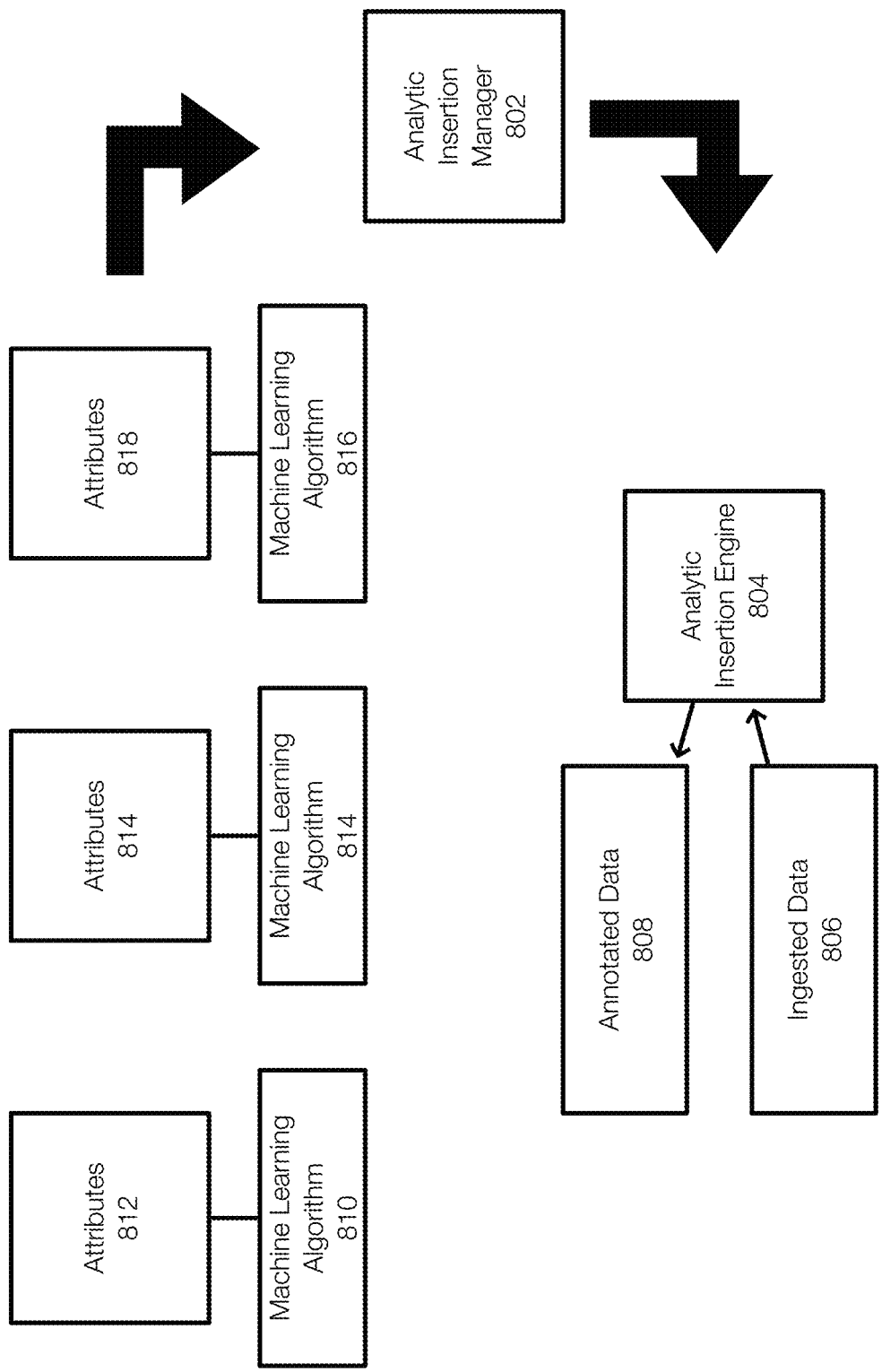
FIG. 8 illustrates an example of an analytic insertion mechanism adapted for multiple applications including multiple machine learning algorithms.

FIG. 8 illustrates the ability to provide analytic values for multiple machine learning algorithms (or other applications and application types). In this example, the machine learning algorithms 810, 814, and 816 are associated with, respectively, attributes 812, 814 and 818. These attributes 812, 814, and 818 may be completely different from each other, overlap, or the like. Feedback for each of the machine learning algorithms 810, 814, and 816 can be provided to the analytic insertion manager 802 in the form of, by way of example only and not limitation, tag matches, missing tags, insights, or the like. This feedback can be used by the analytic insertion manager 802 to generate and deploy new versions of the analytic insertion engine 804, to update the analytic insertion engine 804, or the like.

In addition, multiple instances of the analytic insertion engine 804 may be deployed at different locations of the DCF. In one example, the deployment may also consider the devices generating data and deploy analytic insertion engines that are best suited for data generated by the device type or location.

As a result, the analytic insertion 804 can analysis the ingested data 806 and attach analytic value or annotations, which results in annotated data. The annotated data is ready for consumption by the machine learning algorithms.

Figure 9:
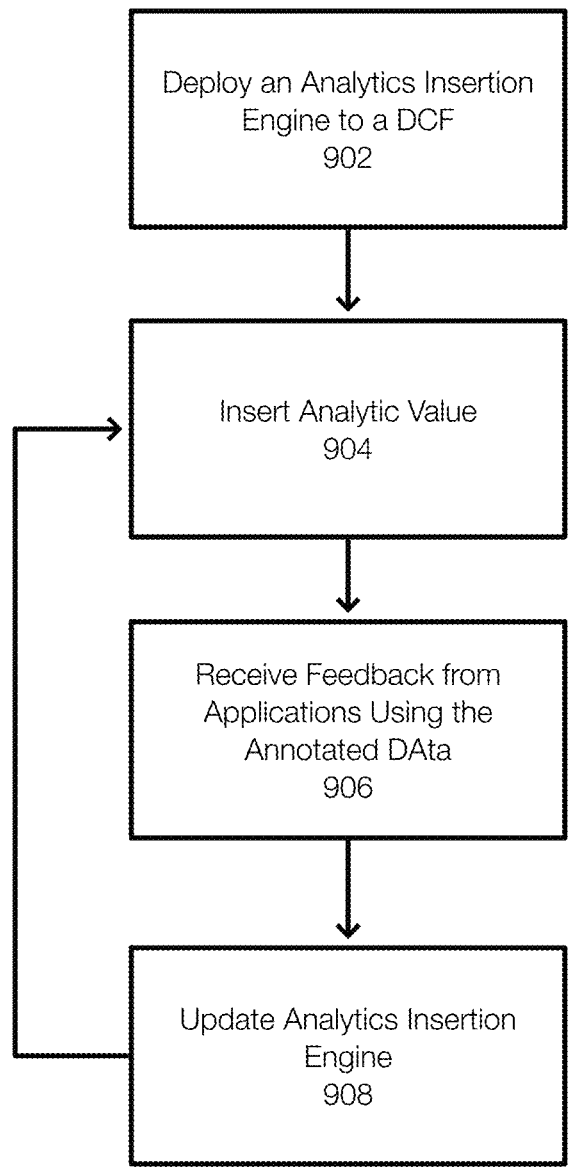
FIG. 9 illustrates an example of annotating data in a DCF.

FIG. 9 illustrates an example of a method for annotating data in a DCF. In one example, an analytics insertion engine is deployed 902 to a DCF. The method may also assume that the analytics insertion engine (or mechanism, which may include an analytics insertion manager) has already been deployed to the DCF.

The analytics insertion engine is typically deployed at the gateway level such that data can be annotated or associated with an analytics value during ingestion or at the point of intake. Embodiments of the invention, however, are not precluded from adding analytic value at other locations in the DCF.

Next, an analytic value is inserted 904 or added to the data. The analytic value can be inserted in a streaming manner or as the data is streamed. The analytic insertion engine may analyze the data and add analytic metadata. The analytic metadata can be based on the data itself or based on environment factors, or the like. For example, when ingesting temperature data, the data may be converted to a standard temperature scale, normalized, or the like. The temperature data may also be annotated with tags such as location, time of day, device manufacturer, or the like. The type of metadata with which data is annotated is broad.

The annotated data or the analytic value can then be used by an application such as a machine learning algorithm. Next, an analytic insertion manager may receive 906 feedback from one or more applications using the annotated data. The feedback may take various forms such as number of matching attributes, insights or value of insights (this may be, by way of example only, an indication of the value of collecting certain combinations of tags that are able to generate valuable insights), missing attributes, or the like.

The feedback allows the analytics insertion manager to update 908 the analytics insertion engine. Updating 908 this engine may include adding new algorithms, replacing the existing algorithm with a new algorithm, or the like. A catalog of engines may be maintained. Further, more than one engine may be deployed.

This process may then repeat. Over time, the analytics insertion mechanism can adapt to new applications, improve existing applications, and the like. In addition, the insertion analytics mechanism can change the analytics confidence score associated with or included in the analytic value. The change in the analytics confidence score may be based on the feedback.

When generating feedback, the analytics insertion mechanism may be inclined to include various classes and/or types of algorithms.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data confidence fabric operations. Such operations include ingesting data, annotating data, scoring data, machine learning operations, updating analytic insertion engines, or the like or combination thereof. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method, comprising A method for annotating data ingested into a data confidence fabric, the method comprising: associating an analytic value to data as the data is ingested into the data confidence fabric, wherein the analytic value includes one or more tags, receiving feedback from an application, wherein the feedback is related to the analytic value, and updating an analytic insertion engine based on the feedback to improve the analytic value associated with data ingested into the data confidence fabric.

Embodiment 2. The method of embodiment 1, further comprising receiving matching tags in the feedback between attributes of the application and the one or more tags included in the analytic value.

Embodiment 3. The method of embodiment 1 and/or 2, further comprising increasing a confidence of the analytic value based on the matching tags.

Embodiment 4. The method of any of embodiments 1 through 3, further comprising updating the analytic insertion engine based on the matching tags.

Embodiment 5. The method of any of embodiments 1 through 4, further comprising receiving insights from the application as the feedback.

Embodiment 6. The method of any of embodiments 1 through 5, wherein the insights relate to multiple tags included in the analytic value.

Embodiment 7. The method of any of embodiments 1 through 6, further comprising increasing an analytic confidence score when the multiple tags associated with the insights are identified and included in the analytic value.

Embodiment 8. The method of any of embodiments 1 through 7, further comprising updating the analytic insertion engine based on the insights.

Embodiment 9. The method of any of embodiments 1 through 8, further comprising receiving missing tags from the application as the feedback.

Embodiment 10. The method of any of embodiments 1 through 9, further comprising updating the analytic insertion engine such that the analytic insertion engine is configured to add tags corresponding to the missing tags to the analytic value when found in the data.

Embodiment 11. A method for performing any of the operations, methods, or processes, or any portion of any of these, disclosed in embodiments 1-10 or elsewhere herein.

Embodiment 12. A non-transitory storage medium having stored therein instructions that are executable by one or more hardware processors to perform the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device, one example of which is denoted at. As well, where any of the aforementioned elements comprise or consist of a virtual machine (VM), that VM may constitute a virtualization of any combination of the physical components disclosed herein.

In one example, the physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid-state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for annotating data ingested into a data confidence fabric, the method comprising:
    associating an analytic value with data, by an analystic insertion engine, as the data is ingested into the data confidence fabric, wherein the analytic value includes one or more tags and metadata, wherein inserting the analytic value includes annotating the data with the one or more tags and the metadata such that the data is immediately available for use by an application;
    associating a confidence score to the data as the data is ingested into the data confidence fabric, wherein the confidence score indicates a trustworthiness of the data;
    receiving feedback from the application, wherein the application is configured to associate the one or more tags and the metadata with attributes and is trained to generate the feedback based on the analytic value associated with the data; and
    updating the analytic insertion engine with the feedback to improve the analytic insertion engine such that improved analytic values are generated by the analytic insertion engine and associated with data ingested into the data confidence fabric.

2. The method of claim 1, further comprising receiving matching tags in the feedback between attributes of the application and the one or more tags included in the analytic value.

3. The method of claim 2, further comprising increasing a confidence of the analytic value based on the matching tags.

4. The method of claim 3, further comprising updating the analytic insertion engine based on the matching tags.

5. The method of claim 1, further comprising receiving insights from the application as the feedback.

6. The method of claim 5, wherein the insights relate to multiple tags included in the analytic value.

7. The method of claim 6, further comprising increasing an analytic confidence score when the multiple tags associated with the insights are identified and included in the one or more tags associated with the analytic value.

8. The method of claim 7, further comprising updating the analytic insertion engine based on the insights.

9. The method of claim 1, further comprising receiving missing tags from the application as the feedback.

10. The method of claim 9, further comprising updating the analytic insertion engine such that the analytic insertion engine is configured to add tags corresponding to the missing tags to the analytic value when found in the data.

11. A non-transitory storage medium having stored therein instructions that are executable by one or more hardware processors to perform operations comprising:
    associating an analytic value with data, by an analytic insertion engine, as the data is ingested into the data confidence fabric, wherein the analytic value includes one or more tags and metadata, wherein inserting the analytic value includes annotating the data with the one or more tags and the metadata such that the data is immediately available for use by an application;
    associating a confidence score to the data as the data is ingested into the data confidence fabric, wherein the confidence score indicates a trustworthiness of the data;
    receiving feedback from the application, wherein the application is configured to associate the one or more tags and the metadata with attributes and is trained to generate the feedback based on the analytic value associated with the data; and
    updating the analytic insertion engine with the feedback to improve the analytic insertion engine such that improved analytic values are generated by the analytic insertion engine and associated with data ingested into the data confidence fabric.

12. The non-transitory storage medium of claim 11, the operations further comprising receiving matching tags in the feedback between attributes of the application and the one or more tags included in the analytic value.

13. The non-transitory storage medium of claim 12, the operations further comprising increasing a confidence of the analytic value based on the matching tags.

14. The non-transitory storage medium of claim 13, the operations further comprising updating the analytic insertion engine based on the matching tags.

15. The non-transitory storage medium of claim 11, the operations further comprising receiving insights from the application as the feedback.

16. The non-transitory storage medium of claim 15, the operations wherein the insights relate to multiple tags included in the analytic value.

17. The non-transitory storage medium of claim 16, the operations further increasing an analytic confidence score when the multiple tags associated with the insights are identified and included in the one or more tags associated with the analytic value.

18. The non-transitory storage medium of claim 17, the operations further comprising updating the analytic insertion engine based on the insights.

19. The non-transitory storage medium of claim 11, the operations further comprising receiving missing tags from the application as the feedback.

20. The non-transitory storage medium of claim 19, the operations further comprising updating the analytic insertion engine such that the analytic insertion engine is configured to add tags corresponding to the missing tags to the analytic value when found in the data.

* * * * *